United States Patent
Yamazaki (10) Patent No.: US 7,487,295 B2
(45) Date of Patent: Feb. 3, 2009

(54) MEMORY CONTROL DEVICE AND MOVE-IN BUFFER CONTROL METHOD

(75) Inventor: Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 10/991,871

(22) Filed: Nov. 19, 2004

(65) Prior Publication Data

US 2006/0026362 A1 Feb. 2, 2006

(30) Foreign Application Priority Data

Jul. 30, 2004 (JP) ............... 2004-224855

(51) Int. Cl.
*G06F 12/08* (2006.01)
(52) U.S. Cl. .............. 711/118; 711/133; 711/144; 711/145
(58) Field of Classification Search .......... 711/118, 711/133, 144, 145
See application file for complete search history.

(56) References Cited

U.S. PATENT DOCUMENTS 5,023,776 A * 6/1991 Gregor ............... 711/122

2001/0032307 A1 * 10/2001 Rohlman et al. ............ 712/219

FOREIGN PATENT DOCUMENTS

| JP | 2002-342163 A | 11/2002 |
| WO | WO 99/27452 | 6/1999 |

OTHER PUBLICATIONS

European Search Report, mailed Nov. 7, 2007 and issued in corresponding European Patent Application No. 04257387.3-1229.

* cited by examiner

*Primary Examiner*—Sanjiv Shah
*Assistant Examiner*—Jae U Yu
(74) *Attorney, Agent, or Firm*—Staas & Halsey LLP (57) ABSTRACT

A central processor requests for reference to data stored in a main storage for each of a plurality of threads. A thread identification information obtaining unit obtains thread identification information that identifies the threads. A valid MIB detector detects the number of the primary cache MIBs that hold requests of the cache for reference to data stored in the mains storage, for each thread based on the thread identification information. The MIB controller controls to hold reference requests in the primary cache MIBs such that the number of the primary cache MIBs detected for each thread does not exceed a predetermined number.

8 Claims, 8 Drawing Sheets

| VALID FLAG | THREAD IDENTIFICATION INFORMATION | OTHER CONTROL BITS | ADDRESS |

MEMORY CONTROL DEVICE AND MOVE-IN BUFFER CONTROL METHOD

BACKGROUND OF THE INVENTION

1) Field of the Invention

The present invention relates to a memory control device and a move-in buffer control method.

2) Description of the Related Art

Conventionally, the operation speed of a central processor is much faster than the operation speed of a main storage, which raises a problem that when the main storage is referred to, the operation of the central processor must wait for a long time.

In order to solve this problem, a system called a multi-thread mechanism is used. When a central processor stops operation for a long time upon a reference to a main storage, the multi-thread mechanism interrupts a program currently in execution, and switches the operation to another program. Three types of control systems are used for the multi-thread mechanism: systems called an SMT (Simultaneous Multi Threading), and an HMT (Horizontal Multi Threading) that simultaneously operate two or more programs, and a system called a VMT (Vertical Multi Threading) that usually operates one program, and switches the operation of this program to the operation of another program upon occurrence of a waiting for a main storage.

A central processor that carries out a multi-thread operation shares an operation device, a primary cache memory, a secondary cache memory, and move-in buffers (hereinafter, "MIBs") for the primary cache and the secondary cache, between threads. It is possible to simultaneously refer to data of the secondary cache and the main storage corresponding to the number of MIBs installed on the central processor. In other words, it is not possible to refer to the data in the secondary cache and the main storage more than the number of the MIBs that are installed on the central processor.

When one thread uses all the MIBs during a multi-thread operation, it is not possible to refer to data of the secondary cache and the main storage when other threads cause a cache miss. After a cache line requested from the MIB returns to the central processor, the cache line is registered into the primary cache or the secondary cache of the central processor. The MIB is released after this registration. The release of the MIB is delayed substantially if a cache line is fetched from the main storage. During this delay period, data of the secondary cache or the main storage cannot be referred to from other threads. Therefore, although multi-thread operation is carried out, a cache miss caused by one thread stops the operation of all the threads. Japanese Patent Application Laid-Open No. 2002-342163 discloses a conventional technique of controlling sharing and non-sharing of a cache among threads during a multi-thread operation.

According to the conventional technique, sharing and non-sharing of a cache among threads can be controlled during a multi-thread operation. However, the Patent Literature 1 does not disclose a conventional technique regarding an MIB to be used for the registration of a cache line to a cache. Therefore, the problem of the stoppage of the operation of all the threads when even one thread causes a cache miss during a multi-thread operation, remains unsolved.

SUMMARY OF THE INVENTION

It is an object of the present invention to solve at least the problems in the conventional technology.

A memory control device according to an aspect of the present invention includes a central processor; a cache that controls the central processor in referring to data stored in a main storage, and stores data stored in the main storage and address information corresponding to the data; and a cache buffer that holds address information as a request of the cache for reference to data stored in the main storage. The central processor includes a thread identification information obtaining unit that requests for reference to data stored in the main storage for each of a plurality of threads, and obtains thread identification information for each of the threads; a valid buffer detector that detects number of cache buffers that hold the reference requests for each thread based on the thread identification information; and a buffer controller that controls to hold the reference requests in the cache buffers such that the number of the cache buffers detected for each thread does not exceed a predetermined number.

A method of controlling a move-in buffer according to another aspect of the present invention is executed on a memory control device including a central processor; a cache that controls the central processor in referring to data stored in a main storage, and stores data stored in the main storage and address information corresponding to the data; and a cache buffer that holds address information as a request of the cache for reference to data stored in the main storage. The method includes the central processor executing requesting for reference to data stored in the main storage for each of a plurality of threads, and obtaining thread identification information for each of the threads; detecting number of cache buffers that hold the reference requests for each thread based on the thread identification information; and controlling to hold the reference requests in the cache buffers such that the number of the cache buffers detected for each thread does not exceed a predetermined number.

A memory control device according to still another aspect of the present invention includes a plurality of central processors; a cache that controls the central processors in referring to data stored in a main storage, and stores data stored in the main storage and address information corresponding to the data; a cache buffer that holds address information as a request of the cache for reference to data stored in the main storage; a device identification information obtaining unit that obtains device identification information of the central processors; a valid buffer detector that detects number of cache buffers that hold the reference requests for each central processor based on the device identification information; and a buffer controller that controls to hold the reference requests in the cache buffers such that the number of the cache buffers detected for each central processor does not exceed a predetermined number.

A method of controlling a move-in buffer according to still another aspect of the present invention is executed on a memory control device including a plurality of central processors; a cache that controls the central processors in referring to data stored in a main storage, and stores data stored in the main storage and address information corresponding to the data; and a cache buffer that holds address information as a request of the cache for reference to data stored in the main storage. The method includes obtaining device identification information of the central processors; detecting number of cache buffers that hold the reference requests for each central processor based on the device identification information; and controlling to hold the reference requests in the cache buffers such that the number of the cache buffers detected for each central processor does not exceed a predetermined number.

The other objects, features, and advantages of the present invention are specifically set forth in or will become apparent

DETAILED DESCRIPTION

Exemplary embodiments of a memory control device and a method of controlling a move-in buffer according to the present invention will be explained in detail with reference to the accompanying drawings.

A first embodiment of the present invention relates to application of a memory control device according to the present invention to a computer system during a multi-thread operation. A second embodiment relates to application of the memory control device according to the present invention to a multi-processor system. A third embodiment relates to execution of a move-in buffer control program that has the same function as that of the memory control device according to the present invention is explained as a third embodiment.

In the first embodiment, application of a memory control device according to the present invention to a computer system during a multi-thread operation is explained. The first embodiment is explained in the order of outline and main characteristics of a memory control device, configuration of a computer system, MIB control during a multi-thread operation, and MIB control procedure during a multi-thread operation.

Figure 1:
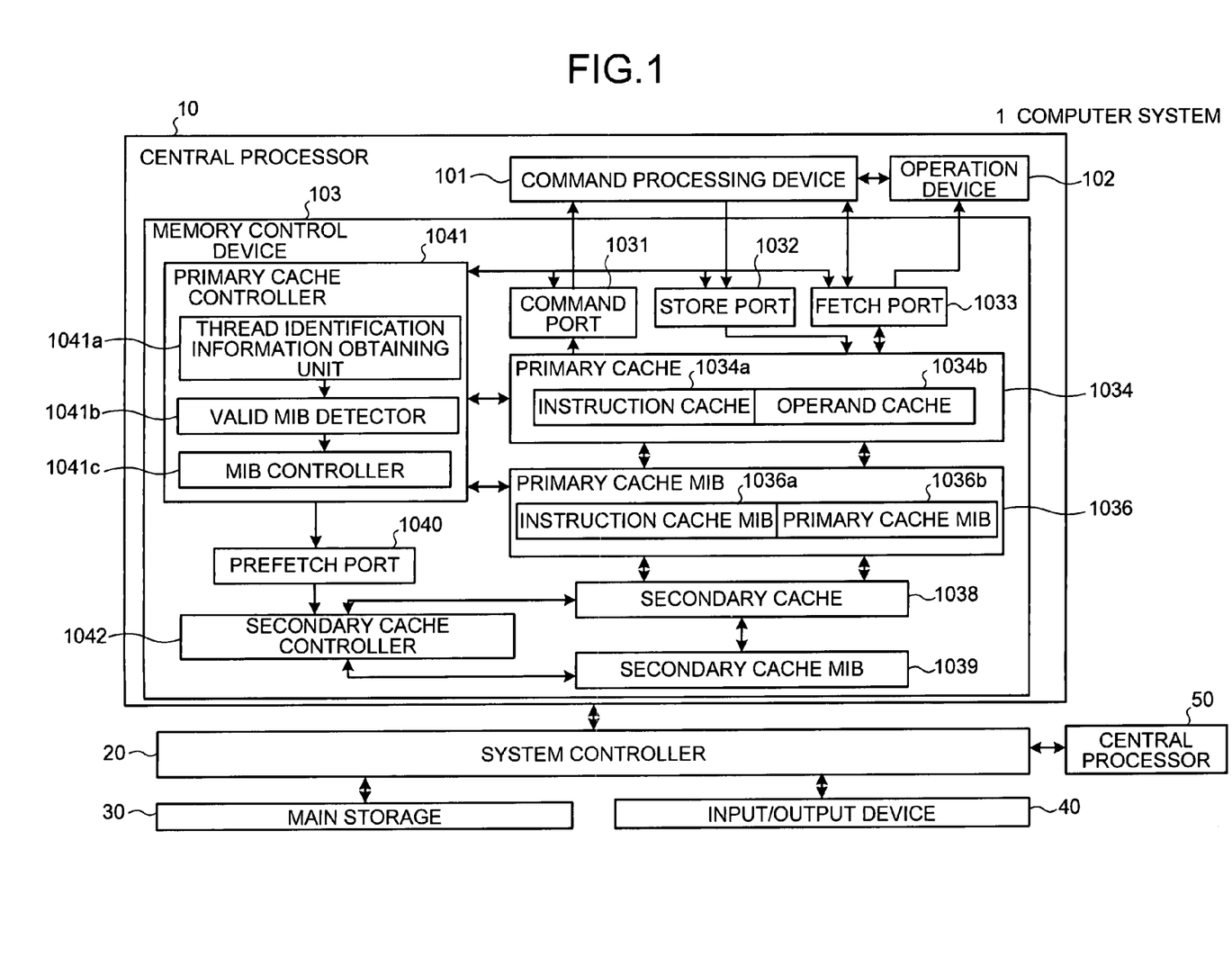
FIG. 1 is a functional block diagram of a configuration of a computer system according to a first embodiment of the present invention.

Outline and main characteristics of a memory control device 103 are explained with reference to FIG. 1. FIG. 1 is a functional block diagram of a configuration of a computer system 1 according to the first embodiment.

The memory control device 103 according to the present invention has a secondary cache 1038 that controls a central processor 10 in referring to data stored in a main storage 30, and stores the data of the main storage 30 and address information corresponding to this data, a primary cache 1034 that stores data of the secondary cache 1038 and address information corresponding to this data, a secondary cache MIB 1039 that holds a request of the secondary cache 1038 for reference to data stored in the main storage 30, and a primary cache MIB 1036 that holds a request of the primary cache 1034 for reference to data of the secondary cache 1038. With this arrangement, even when one thread causes a cache miss during a multi-thread operation, stoppage of the operation of all the threads can be avoided.

The central processor 10 requests for reference to data stored in the main storage 30 for each of the threads. A thread identification information obtaining unit 1041a obtains thread identification information that identifies threads. A valid MIB detector 1041b detects the number of primary cache MIBs 1036 that hold reference requests, for each thread based on the thread identification information. An MIB controller 1041c controls to hold the reference requests in the cache buffers such that the number of the cache buffers detected for each thread does not exceed a predetermined number. Therefore, the memory control device 103 can avoid stoppage of the operation of all the threads even when one thread causes a cache miss during a multi-thread operation.

A configuration of the computer system 1 according to the first embodiment is explained with reference to FIG. 1. The computer system 1 has central processors 10 and 50, a system controller 20, the main storage 30, and an input/output device 40. Each of the central processors 10 and 50 stores a result of data processing into the main storage 30 again according to a program stored in the main storage 30, and has a command processing device 101, an operation device 102, and the memory control device 103.

The command processing device 101 controls the whole central processor 10, and reads a command that forms a program from the main storage 30, decodes the read command, issues a request to each device based on the decoded command, and executes the program. The operation device 102 reads data from the main storage 30, and executes various kinds of operations based on the read data. The memory control device 103 is provided between the command processing device 101, the operation device 102, and the main storage 30, and controls the command processing device 101 and the operation device 102 in their reference to data stored in the main storage 30. The memory control device 103 is explained in further detail after the explanation of the configuration of the computer system 1.

The system controller 20 controls the whole computer system 1 that consists of the central processors 10 and 50, the main storage 30, and the input/output device 40. The main storage 30 stores programs and data, and includes semiconductor memories such as an SRAM (Static Random Access Memory), and a DRAM (Dynamic Random Access Memory).

The input/output device 40 includes an input device such as a keyboard and a mouse that a user uses to input requests and instructions, an external storage such as a floppy (a registered trade name) disk and an HDD (Hard Disk Drive) into which programs and data are input, and an output device such as an LCD (Liquid Crystal Display) and a printer that outputs data.

The memory control device 103 is explained in detail next. The memory control device 103 has a command port 1031, a store port 1032, a fetch port 1033, the primary cache 1034, the primary cache MIB 1036, the secondary cache 1038, the secondary cache MIB 1039, a prefetch port 1040, a primary cache controller 1041, and a secondary cache controller 1042.

The command port 1031 is a buffer that temporarily stores a command of a series of programs fetched from the primary cache 1034. The store port 1032 is a buffer that temporarily stores a store command to instruct the writing of an operation result into the primary cache 1034, the secondary cache 1038, or the main storage 30. The fetch port 1033 is a buffer that temporarily stores a fetch processing request read from the primary cache 1034, the secondary cache 1038, or the main storage 30.

The primary cache 1034 stores a part of data from the secondary cache 1038, and a physical address corresponding to the part of the data, and has an instruction cache 1034a that stores a program, and an operand cache 1034b that stores data. The primary cache MIB 1036 is a buffer that stores a physical address of a cache line as a reference request, at the time of achieving a move-in of the cache line from the secondary cache 1038 that causes a cache miss, that is, at the time of referring to data stored in the secondary cache 1038. The primary cache MIB 1036 has an instruction cache MIB 1036a that stores a physical address of a program, and an operand cache MIB 1036b that stores a physical address of data. Each of the instruction cache MIB 1036a and the operand cache MIB 1036b has four MIBs, for example. The primary cache 1034 cannot request the secondary cache 1038 for a move-in of data to the primary cache 1034 more than the number of MIBs in the primary cache MIB 1036.

The secondary cache 1038 stores a part of a program or data stored in the main storage 30, and a physical address corresponding to the part of the program and the data. The secondary cache MIB 1039 is a buffer that stores a physical address of a cache line as a reference request at the time of referring to data store in the main storage 30 when a cache miss occurs. The secondary cache MIB 1039 has 16 MIBs, for example. The secondary cache 1038 cannot request the main storage 30 for a reference of data to the to the main storage 30 more than the number of the secondary cache MIB 1039.

The prefetch port 1040 is a buffer into which the primary cache controller 1041 transfers a data reference request from the main storage 30 to the secondary cache 1038 when there is no room in the primary cache MIBs 1036. The primary cache controller 1041 requests the secondary cache MIB 1039 to prefetch data separately from a route via the primary cache MIB 1036.

More specifically, when there is no room in the primary cache MIBs 1036 and when a subsequent command causes a cache miss, the primary cache controller 1041 requests for a move-in from the main storage 30 to the secondary cache using the prefetch port 1040. The prefetch port 1040 cannot achieve a move-in to the primary cache 1034. However, when there is room in the primary cache 1034 afterward, the primary cache controller 1041 requests a move-in to the primary cache 1034 via the primary cache MIBs 1036.

In other words, when a move-in to the primary cache 1034 cannot be achieved, the prefetch port 1040 starts a move-in to the secondary cache 1038 in advance. With this arrangement, when the prefetch port 1040 starts a move-in to the primary cache 1034 as soon as there is room in the primary cache MIB 1036, the cache line already reaches the secondary cache or reaches near the secondary cache. Therefore, the prefetch port 1040 can shorten the time from the securing of the primary cache MIB 1036 to the completion of the move-in.

The primary cache controller 1041 controls the command port 1031, the store port 1032, the fetch port 1033, the primary cache 1034, the primary cache MIB 1036, and the prefetch port 1040. The primary cache controller 1041 has the thread identification information obtaining unit 1041a, the valid MIB detector 1041b, and the MIB controller 1041c.

The thread identification information obtaining unit 1041a obtains thread identification information that identifies the threads, and obtains thread identification information from the command processing device 101. The valid MIB detector 1041b detects the number of the primary cache MIBs 1036 that hold requests of the primary cache 1036 for reference to data stored in the main storage 30 for each thread based on the thread identification information. The valid MIB detector 1041b is explained in detail later. The MIB controller 1041c controls to hold reference requests in the primary cache MIBs 1036 such that the number of the primary cache MIBs 1036 detected for each thread does not exceed a predetermined number.

Figure 2:
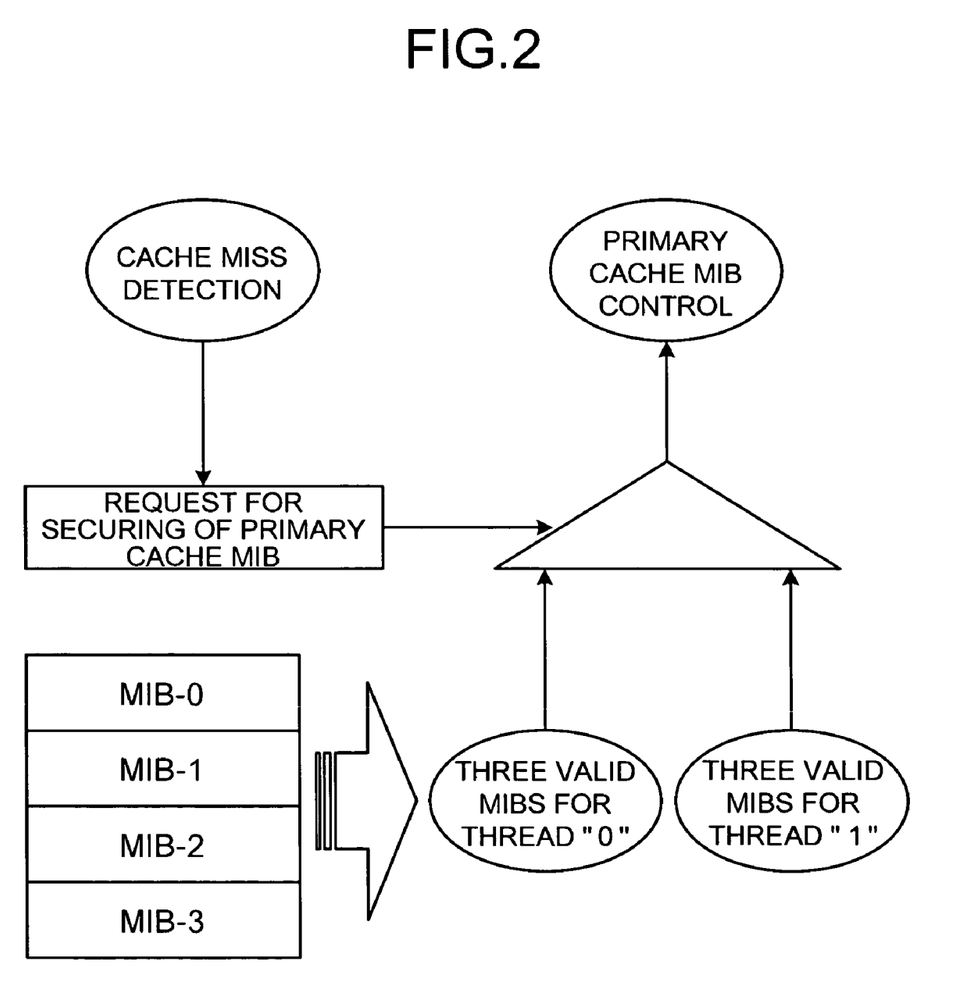
FIG. 2 is an explanatory diagram of an MIB control carried out during a multi-thread operation by an MIB controller 1041c shown in FIG. 1.

The MIB control carried out during a multi-thread operation by the MIB controller 1041c shown in FIG. 1 is explained next with reference to FIG. 2. FIG. 2 is an explanatory diagram of the MIB control carried out during a multi-thread operation by the MIB controller 1041c shown in FIG. 1. As shown in the drawing, when a command of a certain thread causes a cache miss, the primary cache controller 1041 requests to secure the primary cache MIBs 1036. The valid MIB detector 1041b detects the number of the primary cache MIBs 1036 that hold reference requests for each thread based on the thread identification information. The MIB controller 1041c controls to hold reference requests in the primary cache MIBs 1036 such that the number of the cache buffers detected for each thread does not exceed a predetermined number.

Figure 3:
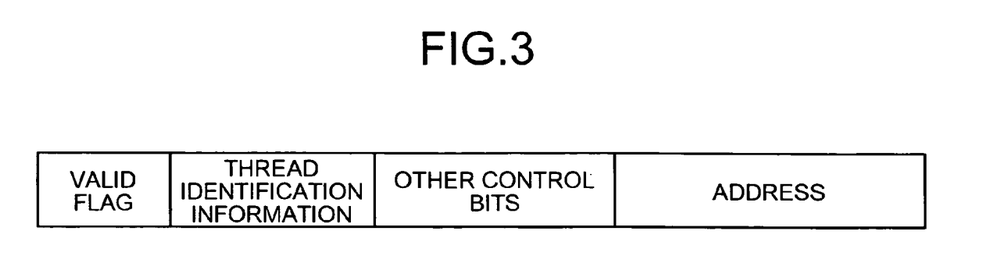
FIG. 3 is a data structure of a primary cache MIB detected by a valid MIB detector shown in FIG. 1.

A data structure of the primary cache MIB 1036 that is detected by the valid MIB detector 1041b shown in FIG. 1 is explained with reference to FIG. 3. FIG. 3 depicts a data structure of the primary cache MIB 1036 that is detected by the valid MIB detector 1041b shown in FIG. 1. As shown in the drawing, the primary cache MIB 1036 has a valid flag that indicates a using state of the MIB. When the valid flag is "1", this indicates that the MIB is being used. When the command processing device 101 executes two threads in parallel, the two threads can be identified using thread identification information of "0" and "1", for example. The primary cache MIB 1036 has a physical address as a reference request item.

Figure 4:
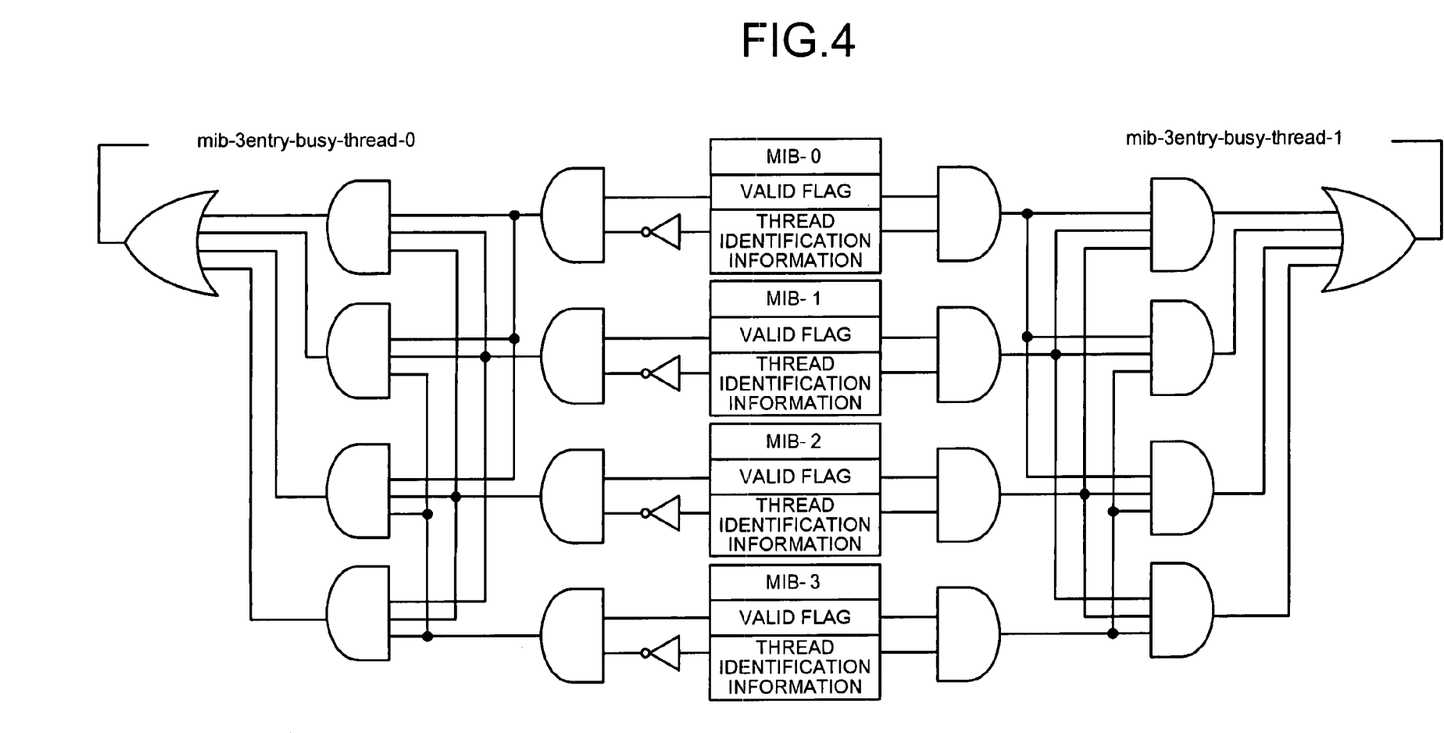
FIG. 4 is a functional block diagram of a configuration of the valid MIB detector shown in FIG. 1.

The valid MIB detector 1041b takes out a valid flag and thread identification information from the primary cache MIB 1036, and detects the number of valid MIBs for each thread. A configuration of the valid MIB detector 1041b shown in FIG. 1 is explained with reference to FIG. 4. FIG. 4 is a functional block diagram of the configuration of the valid MIB detector 1041b shown in FIG. 1. The valid MIB detector 1041b detects whether a thread "1" occupies optional three MIBs out of four MIBs, with a right half part of the detector, and detects whether a thread "0" occupies optional three MIBs out of the four MIBs, with a left half part of the detector.

For example, in the right half of the detector shown in FIG. 4, a value "0" or "1" of valid flags of the four MIBs and a value "0" or "1" of thread identification information are input to an AND circuit at a first stage. Regarding a combination of three outputs out of four outputs from the AND circuit at the first stage, the outputs from the AND circuit at the first stage are input to an AND circuit at a second stage. Four outputs from the AND circuit at the second stage are input to an OR circuit. When the output from the OR circuit is "1", this indicates that the thread "1" is using optional three MIBs out of the four MIBs. Similarly, in the left half of the detector shown in the drawing, when the output from the OR circuit is "1", this indicates that the thread "0" is using optional three MIBs out of the four MIBs.

Figure 5:
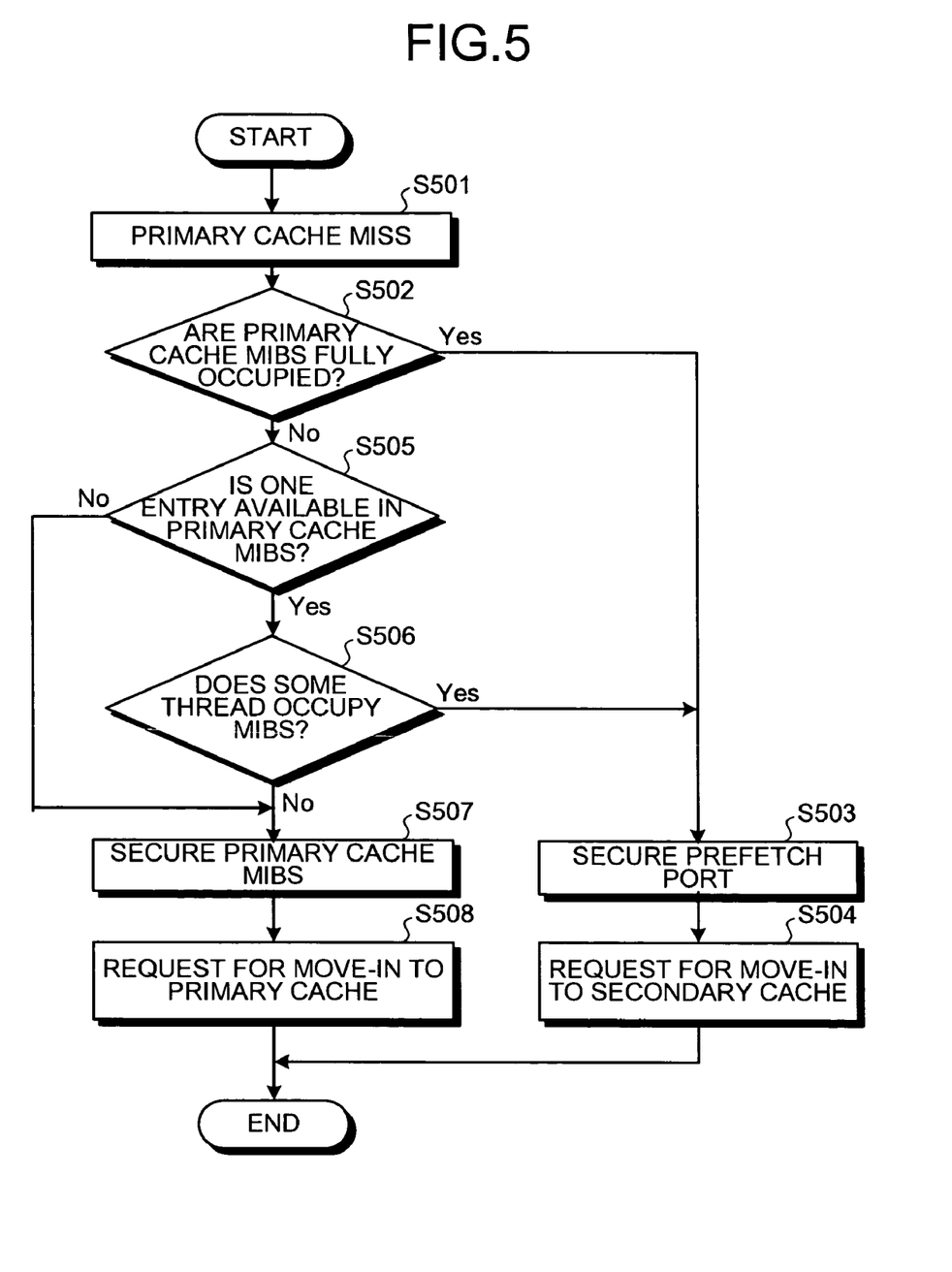
FIG. 5 is a flowchart of an MIB control procedure during a multi-thread operation by the MIB controller shown in FIG. 1.

An MIB control procedure during a multi-thread operation by the MIB controller 1041c shown in FIG. 1 is explained next with reference to FIG. 5. FIG. 5 is a flowchart of the MIB control procedure during a multi-thread operation by the MIB controller 1041c shown in FIG. 1. As shown in the drawing, when any one of a load command, a store command, and a prefetch command of a thread "0" or "1" that is input to a pipeline of the primary cache 1034 causes a cache miss (step S501), the MIB controller 1041c confirms with the valid MIB detector 1041b whether the primary cache MIBs 1036 are fully occupied (step S502).

When the primary cache MIBs 1036 are fully occupied (Yes at step S502), the MIB controller 1041c secures the prefetch port 1040 (step S503), and requests for a move-in to the secondary cache 1038 (step S504).

On the other hand, when the primary cache MIBs 1036 are not fully occupied (No at step S502), the MIB controller 1041c confirms with the valid MIB detector 1041b whether the number of the available entry is one in the primary cache MIBs 1036 (step S505).

When two or more entries are available in the primary cache MIBs 1036 (No at step S505), the MIB controller 1041c secures the primary cache MIBs 1036 (step S507), and requests for a move-in to the primary cache 1034 (step S508).

On the other hand, when one entry is available in the primary cache MIBs 1036 (Yes at step S505), the MIB controller 1041c confirms whether the same thread occupies the MIBs (step S506).

When the same thread occupies the MIBs (Yes at step S506), the MIB controller 1041c secures the prefetch port 1040 (step S503), and requests for a move-in to the secondary cache 1038 (step S504).

On the other hand, when the same thread does not occupy the MIBs (No at step S506), the MIB controller 1041c secures the primary cache MIBs 1036 (step S507), and requests for a move-in to the primary cache 1034 (step S508).

As explained above, according to the present procedure, when the MIBs are occupied based on any one of a load command, a store command, and a prefetch command of a thread "0" or "1" that is input to a pipeline of the primary cache 1034, the MIB controller 1041c prohibits the securing of the primary cache MIBs 1036 according to the command of the same thread. The MIB controller 1041c secures the prefetch port 1040, and requests for a move-in to the secondary cache 1038. Therefore, the memory control device 103 can obtain the effect of the prefetch while avoiding the exclusive use of the primary cache MIBs 1036 according to the command of the same thread.

As explained above, according to the first embodiment, the central processor 10 requests for reference to data stored in the main storage for each of the threads. The thread identification information obtaining unit 1041a obtains thread identification information of the threads. The valid MIB detector 1041b detects the number of cache buffers in which reference requests are held for each thread based on the thread identification information. The MIB controller 1041c controls to hold reference requests in the cache buffers such that the number of the cache buffers detected for each thread does not exceed a predetermined number. Therefore, the memory control device 103 can avoid stoppage of the operation of all the threads even when one thread causes a cache miss during a multi-thread operation.

Since the thread identification information obtaining unit 1041a obtains the thread identification information from the command processing device 101, the memory control device 103 can securely identify switching between threads based on the thread identification information.

In storing a reference request into the primary cache MIB 1036, the MIB controller 1041c controls to add thread identification information to the reference request. Therefore, the memory control device 103 can easily detect the number of the primary cache MIBs 1036 occupied by the reference requests of the same thread.

The cache has the secondary cache 1038 that stores data stored in the main storage 103 and address information corresponding to the data, and the primary cache 1034 that stores data stored in the secondary cache 1038 and address information corresponding to the data. The cache buffer has the secondary cache MIBs 1039 that hold requests of the secondary cache 1038 for reference to data stored in the main storage 103, and the primary cache MIBs 1036 that hold requests of the primary cache 1034 for reference to data stored in the secondary cache 1038. Reference requests that are controlled to be held in the cache buffer are controlled to be held-in the primary cache MIBs 1036. Reference requests other than the reference requests that are controlled to be held in the cache buffer are transferred from the primary cache 1034 to the secondary cache 1038. Therefore, the memory control device 103 can shorten the time from the securing of the primary cache MIBs 1036 to the completion of the move-in, by staring the move-in to the secondary cache 1038 in advance.

Figure 6:
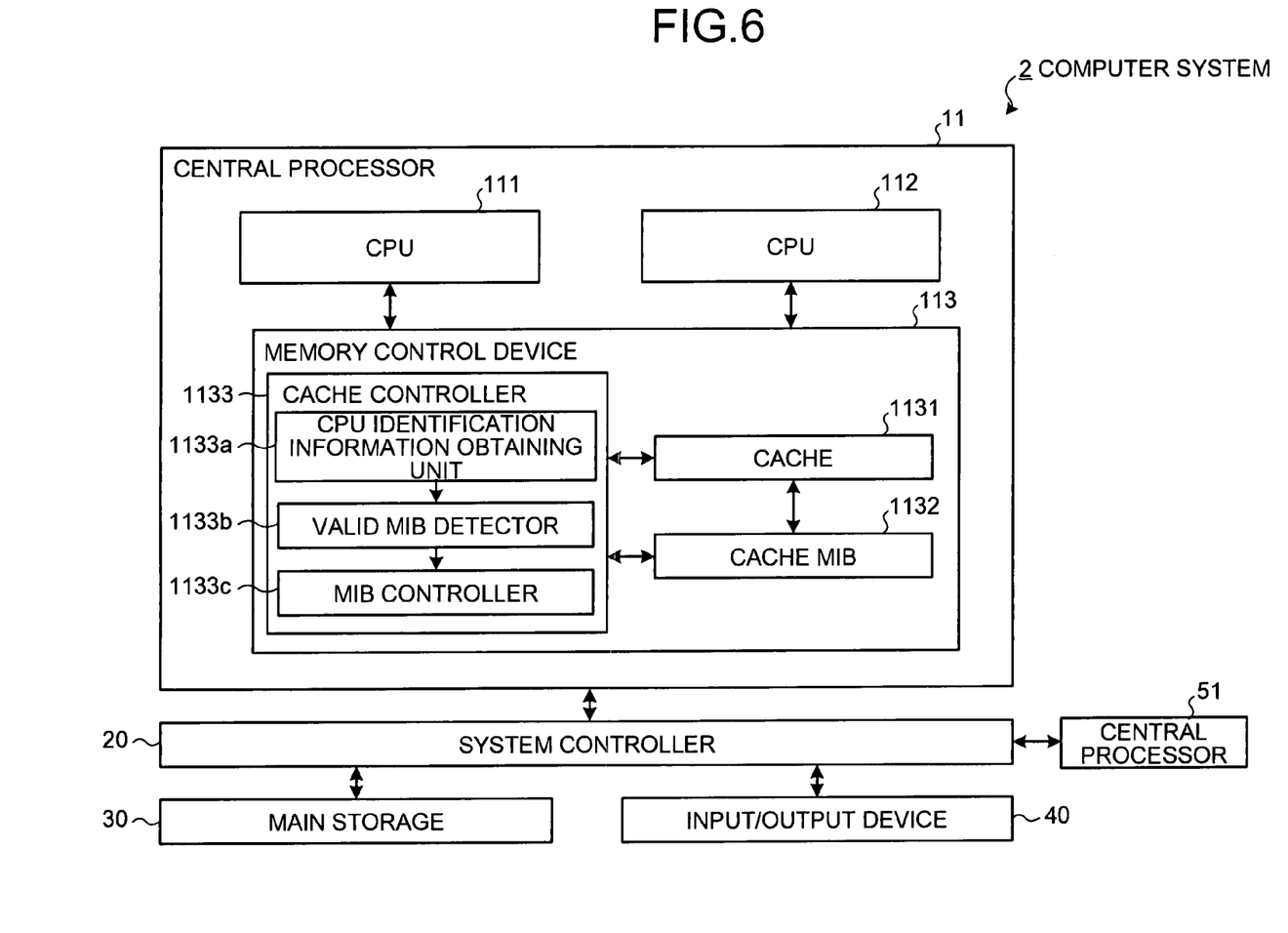
FIG. 6 is a functional block diagram of a configuration of a computer system according to a second embodiment of the present invention.

In a second embodiment, application of a memory control device according to the present invention to a multi-processor system is explained. A configuration of a computer system 2 according to the second embodiment is explained with reference to FIG. 6. FIG. 6 is a functional block diagram of the configuration of the computer system 2 according to the second embodiment. Explanation of contents common to those of the configuration according to the first embodiment is omitted.

As shown in the drawing, the computer system 2 has central processors 11 and 51 that have CPUs 111 and 112 respectively, the system controller 20, the main storage 30, and the input/output device 40. The central processor 11 that is different from the central processor according to the first embodiment is explained below.

The central processor 11 has the CPUs 111 and 112, and a memory control device 113. The CPUs 111 and 112 correspond to the central processor 10 according to the first embodiment, and have at least a command processing device and an operation device. Configurations and functions of these devices are the same as those according to the first embodiment, and therefore, their explanation is omitted.

The memory control device 113 has a cache 1131, a cache MIB 1132, and a cache controller 1133. The cache 1131 is a secondary cache or a tertiary cache that stores a part of data stored in the main storage 30 and a physical address corresponding to the part of the data. The cache MIB 1132 is a buffer that stores a physical address of a cache line as a reference request, at the time of achieving a move-in of the cache line from the main storage 30 that causes a cache miss, that is, at the time of referring to data stored in the main storage 30.

The cache controller 1133 controls the cache 1131 and the cache MIB 1132, and has a CPU identification information obtaining unit 1133a, a valid MIB detector 1133b, and an MIB controller 1133c. The CPU identification information obtaining unit 1133a obtains CPU identification information and thread identification information of the CPUs 111 and 112.

The valid MIB detector 1133b detects the number of the cache MIBs 1132 that hold the reference requests, for each CPU and for each thread based on the CPU identification information and the thread identification information. The valid MIB detector 1133b has a counter that counts number of the cache MIBs 1132 that are being used, for each CPU or for each thread. The valid MIB detector 1133b adds the counter of the CPU or the thread that secures the cache MIBs 1132 when the cache MIBs 1132 are secured. The valid MIB detector 1133b subtracts the counter of the CPU or the thread that releases the cache MIBs 1132 when the cache MIBs 1132 are released. The number of the cache buffers that are provided in the secondary cache or the tertiary cache is about a few times to ten times that of cache buffers provided in the primary cache.

The MIB controller 1133c controls to hold the reference requests in the cache MIBs 1132 such that the number of the cache MIBs 1132 detected for each CPU and for each thread does not exceed a predetermined number.

As explained above, the memory control device 113 is shared by the CPUs 111 and 112, and controls the CPUs 111 and 112 in making reference to data stored in the main storage 30. Therefore, it is possible to avoid such a situation that an exclusive use of the cache MIBs 1132 of the memory control device 113 by one of the CPUs 111 and 112 causes a delay in the securing of the MIBs by the other CPU 111 or 112. Therefore, the MIB control that is the same as the MIB control carried out during the multi-thread operation explained in the first embodiment can be applied.

As described above, according to the second embodiment, the central processor 11 is a multi-processor consisting of the CPUs 111 and 112. The CPUs 111 and 112 request for reference to data stored in the main storage 30 for each of the threads. The CPU identification information obtaining unit 1133a obtains CPU identification information and thread identification information of the CPUs 111 and 112. The valid MIB detector 1133b detects the number of the cache MIBs 1132 that hold reference requests, for each of the CPUs 111 and 112 and for each thread based on the CPU identification information and the thread identification information. The MIB controller 1133c controls to hold the reference requests in the cache MIBs 1132 such that the number of the cache MIBs 1132 detected for each of the CPUs 111 and 112 and for each thread does not exceed a predetermined number. Since the central processor 11 is a multi-processor consisting of the CPUs 111 and 112, there is an effect that the memory control device 113 can avoid stoppage of the operation of all the processors when one processor causes a cache miss. During a multi-thread operation of each of the CPUs 111 and 112, stoppage of the operation of all the threads can be avoided even when one thread causes a cache miss.

The memory control device and the move-in buffer control method explained in the first and the second embodiments can be realized when a computer system such as a personal computer or a workstation executes a program prepared in advance. In a third embodiment, a computer system that executes a move-in buffer control program having the same function as that of the memory control device explained in the first embodiment is explained.

Figure 7:
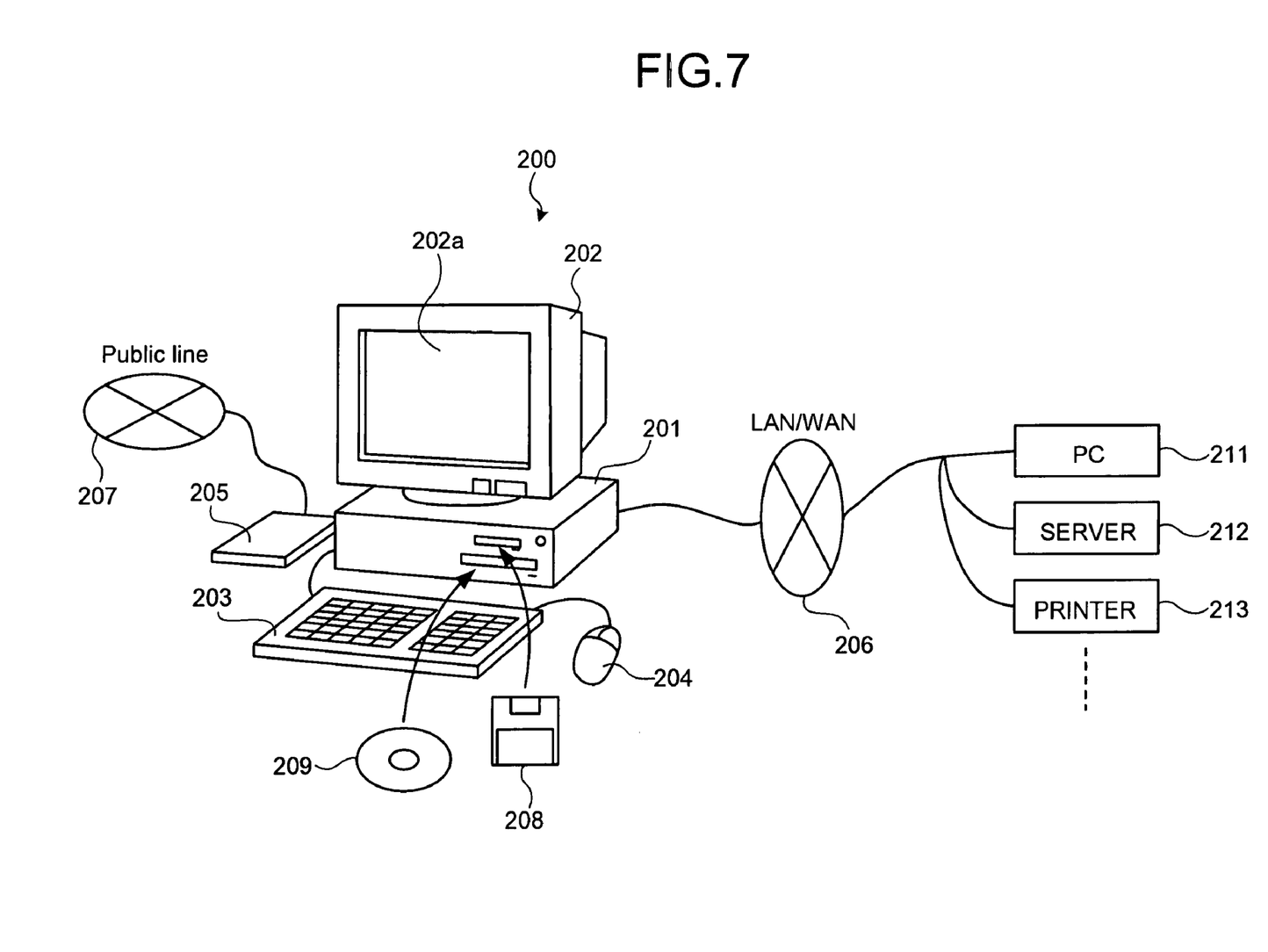
FIG. 7 is a configuration diagram of a computer system according to a third embodiment of the present invention.
Figure 8:
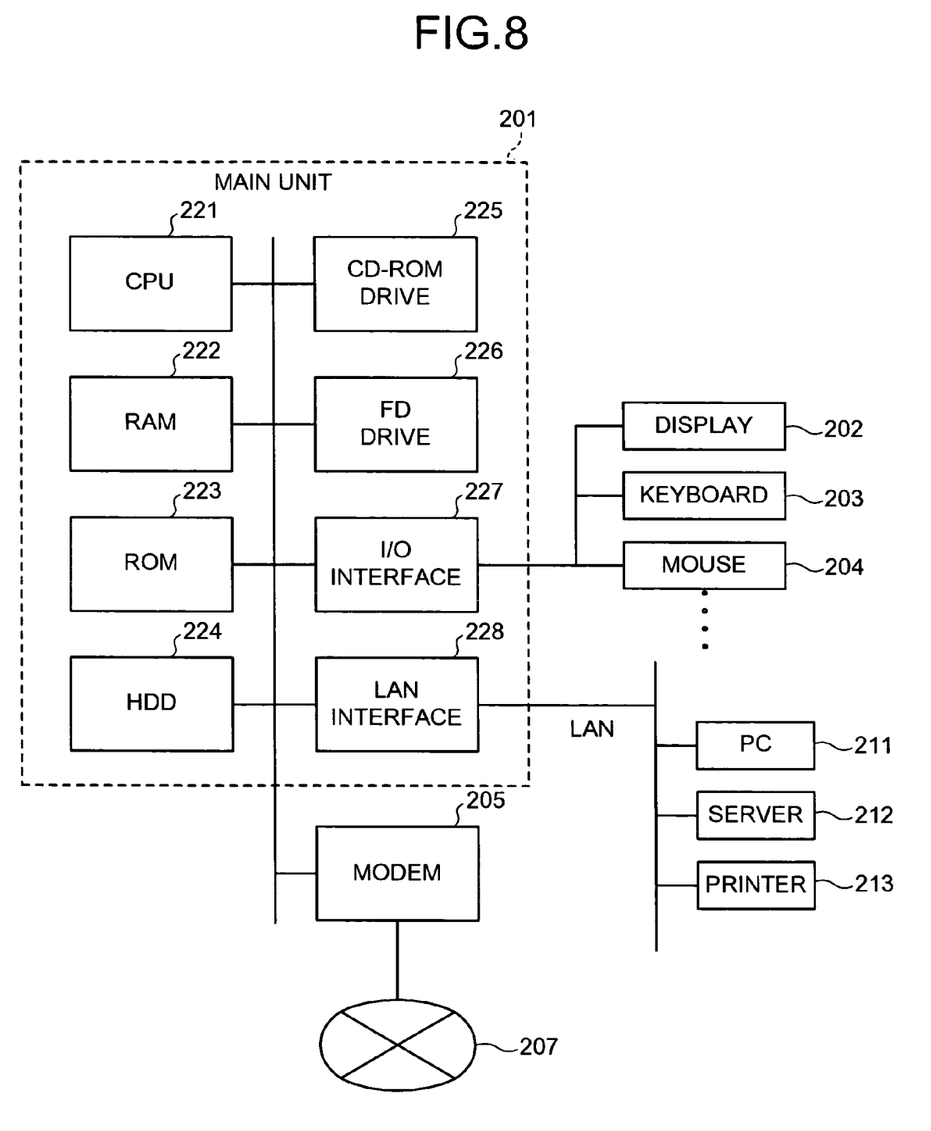
FIG. 8 is a block diagram of a configuration of a main unit in the computer system shown in FIG. 7.

FIG. 7 is a configuration diagram of the computer system according to the third embodiment. FIG. 8 is a block diagram of a configuration of a main unit in the computer system shown in FIG. 7. As shown in FIG. 7, a computer system 200 according to the third embodiment has a main unit 201, a display 202 that displays information such as an image on a display screen 202a according to an instruction from the main unit 201, a keyboard 203 from which various kinds of information are input to the computer system 200, and a mouse 204 that is used to specify an optional position on the display screen 202a of the display 202.

As shown in FIG. 8, the main unit 201 of the computer system 200 has a CPU 221, a RAM 222, a ROM 223, a hard disk drive (HDD) 224, a CD-ROM drive 225 that accommodates a CD-ROM 209, an FD drive 226 that accommodates a flexible disk (FD) 208, an I/O interface 227 that connects the main unit 201 with the display 202, the keyboard 203, and the mouse 204, and a LAN interface 228 that connects the main unit 201 with a local area network or a wide area network (LAN/WAN) 206.

The computer system 200 is connected with a modem 205 that is connected to a public line 207 such as the Internet, and is connected with another computer system (PC) 211, a server 212, and a printer 213 via the LAN interface 228 and the LAN/WAN 206.

The computer system 200 realizes a memory control device by reading and executing a move-in buffer control program that is recorded on a predetermined recording medium. The predetermined recording medium covers all recording mediums that record thereon the move-in buffer control program that is readable by the computer system 200, including "portable physical mediums" such as the flexible disk (FD) 208, the CD-ROM 209, an MO disk, a DVD disk, a magneto optical disk, and an IC card, "fixed physical mediums" such as the hard disk drive (HDD) 224, the RAM 222, and the ROM 223 that are provided inside and outside the computer system 200, and "communication mediums" that hold a program for a short period of time at the time of transmitting the program, such as the public line 207 connected via the modem 205, and the LAN/WAN 206 connected to another computer system 211 and the server 212.

In other words, the move-in buffer control program is recorded onto the recording mediums such as the "portable physical mediums", the "fixed physical mediums", and the "communication mediums" such that the program can be read by the computer. The computer system 200 reads the move-in buffer control program from these recording mediums, and executes the program, thereby realizing the memory control device and the move-in buffer control method. The computer system 200 is not the only unit that executes the move-in buffer control program. The present invention can be also applied to cases when another computer system 211 or the server 212 executes the move-in buffer control program, or the system and the server cooperate to execute the move-in buffer control program.

According to the present invention, a central processor requests for reference to data of a main storage for each of a plurality of threads, obtains thread identification information of the threads, detects the number of cache buffers in which reference requests are held for each thread based on the thread identification information, and holds the reference requests in the cache buffers such that the number of the cache buffers detected for each thread does not exceed a predetermined number. Therefore, there is an effect that the memory control device can avoid stoppage of the operation of all the threads even when one thread causes a cache miss during a multi-thread operation.

According to the present invention, since the central processor obtains thread identification information, there is an effect that the memory control device securely identifies switching of the threads based on the thread identification information.

According to the present invention, in storing reference requests into the cache buffers, thread identification information is added to each reference request. Therefore, there is an effect that the memory control device can easily detect the number of cache buffers occupied by the reference requests of the same thread.

According to the present invention, a cache has a secondary cache that stores data of a main storage and address information corresponding to the data, and a primary cache that stores data of the secondary cache and address information corresponding to the data. A cache buffer has a secondary cache buffer that holds a request of the secondary cache for reference to the data stored in the main storage, and a primary cache buffer that holds a request of the primary cache for reference to the data of the secondary cache. A reference request that is controlled to be held in the cache buffer is controlled to be held in the primary cache buffer. A reference request other than the reference request that is controlled to be held in the cache buffer is transferred from the primary cache to the secondary cache. Therefore, there is an effect that the memory control device can shorten the time from a securing of a primary cache MIB to a completion of move-in, by starting the move-in to the secondary cache in advance.

According to the present invention, the central processor is a multi-processor consisting of a plurality of processors. The processor requests for reference to data stored in the main storage for each of the threads, obtains processor identification information and thread identification information of processors, detects the number of cache buffers in which reference requests are held based on the processor identification information and the thread identification information for each processor and for each thread, and holds reference requests in the cache buffers such that the number of the cache buffers detected for each processor and for each thread does not exceed a predetermined number. Since the central processor is a multi-processor consisting of a plurality of processors, there is an effect that the memory control device can avoid stoppage of the operation of all the processors when one processor causes a cache miss, and also that during a multi-thread operation of each processor, stoppage of the operation of all the threads can be avoided even when one thread causes a cache miss.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. 1. A memory control device comprising:
   a secondary cache that stores data stored in a main storage and address information corresponding to the data;
   a primary cache that stores data of the secondary cache and address information corresponding to the data;
   a secondary cache buffer that holds address information as a request of the secondary cache for reference to data stored in the main storage;
   a primary cache buffer that holds address information as a request of the primary cache for reference to data of the secondary cache; and
   a central processor that controls the cache in referring to data stored in the main storage, wherein
   the central processor includes
   a thread identification information obtaining unit that requests for reference to data stored in the main storage for each of a plurality of threads, and obtains thread identification information for each of the threads;
   a valid buffer detector that detects number of cache buffers in the primary cache buffer that hold reference requests for each thread based on the thread identification information; and
   a buffer controller that controls to hold the reference requests in the primary cache buffer such that the number of cache buffers detected for each thread does not exceed a predetermined number and an exclusive use of the primary cache buffer by a particular thread is prohibited, wherein
   the memory control device further comprises a reference request transfer port as a buffer that transfers the reference requests from the primary cache to the secondary cache, wherein
   when there is no room in the primary cache buffer for a reference request other than reference requests that are controlled to be held in the cache buffer, the buffer controller controls to hold in the primary cache buffer, the reference request that is controlled to be held in the cache buffer, transfers the reference requests other than reference requests that are controlled to be held in the cache buffer from the primary cache to the secondary cache using the reference request transfer port, and makes the reference request transfer port start to store data stored in the main storage in the secondary cache as well as deters the primary cache from storing data from the secondary cache, and
   when there is room in the primary cache buffer after the reference request transfer port starts to store the data in the secondary cache, the buffer controller requests to store the data stored in the secondary cache in the primary cache via the primary cache buffer.

2. The memory control device according to claim 1, wherein the thread identification information obtaining unit obtains the thread identification information from the central processor.

3. The memory control device according to claim 1, wherein the buffer controller controls to add the thread identification information to the reference requests when storing the reference requests to the cache buffers.

4. A method of controlling a move-in buffer, the method being executed on a memory control device including a secondary cache that stores data stored in a main storage and address information corresponding to the data; a primary cache that stores data of the secondary cache and address information corresponding to the data; a secondary cache buffer that holds address information as a request of the cache for reference to data stored in the main storage; a primary cache buffer that holds address information as a request of the primary cache for reference to data of the primary cache; and a central processor that controls the cache in referring to data stored in the main storage, comprising:
   the central processor executing
   requesting for reference to data stored in the main storage for each of a plurality of threads, and obtaining thread identification information for each of the threads;
   detecting a number of cache buffers in the primary cache buffer that hold the reference requests for each thread based on the thread identification information; and
   controlling to hold the reference requests in the primary cache buffer such that the number of cache buffers detected for each thread does not exceed a predetermined number and an exclusive use of the primary cache buffer by a particular thread is prohibited, wherein
   the memory control device further includes a reference request transfer port as a buffer that transfers the reference requests from the primary cache to the secondary cache, wherein
   when there is no room in the primary cache buffer for a reference request other than reference requests that are controlled to be held in the cache buffer, the controlling includes controlling to hold in the primary cache buffer the reference request that is controlled to be held in the cache buffer. transferring the reference requests other than reference requests that are controlled to be held in the cache buffer from the primary cache to the secondary cache using the reference request transfer port, and making the reference request transfer port start to store data stored in the main storage in the secondary cache as well as deterring the primary cache from storing data from the secondary cache, and
   when there is room in the primary cache buffer after the reference request transfer port starts to store the data in the secondary cache, the controlling includes requesting to store the data stored in the secondary cache in the primary cache via the primary cache buffer.

5. The method according to claim 4, wherein the obtaining the thread identification information includes obtaining the thread identification information from the central processor.

6. The method according to claim 4, wherein the controlling includes controlling to add the thread identification information to the reference requests when storing the reference requests into the cache buffers.

7. A memory control device comprising:
a secondary stores data stored in a main storage and address information corresponding to the data;
a primary cache that stores data of the secondary cache and address information corresponding to the data;
a secondary cache buffer that holds address information as a request of the cache for reference to data stored in the main storage;
a primary cache buffer that holds address information as a request of the primary cache for reference to data of the secondary cache;
a plurality of central processors that control the cache in referring to data stored in the main storage;
a device identification information obtaining unit that obtains device identification information of the central processors;
a valid buffer detector that detects number of cache buffers in the primary cache buffer that hold the reference requests for each central processor based on the device identification information; and
a buffer controller that controls to hold the reference requests in the primary cache buffer such that the number of cache buffers detected for each central processor does not exceed a predetermined number and an exclusive use of the primary cache buffer by a particular device is prohibited, wherein
the memory control device further comprises a reference request transfer port as a buffer that transfers the reference requests from the primary cache to the secondary cache, wherein
when there is no room in the primary cache buffer for a reference request other than reference requests that are controlled to be held in the cache buffer, the buffer controller controls to hold in the primary cache buffer the reference request that is controlled to be held in the cache buffer, transfers the reference requests other than reference requests that are controlled to be held in the cache buffer from the primary cache to the secondary cache using the reference request transfer pork and makes the reference request transfer port start to store data stored in the main storage in the secondary cache as well as deters the primary cache from storing data from the secondary cache, and when there is room in the primary cache buffer after the reference request transfer port starts to store the data in the secondary cache, the buffer controller requests to store the data stored in the secondary cache in the primary cache via the primary cache buffer.

8. A method of controlling a move-in buffer, the method being executed on a memory control device including a secondary cache that stores data stored in a main storage and address information corresponding to the data; a primary cache that stores data of the secondary cache and address information corresponding to the data; a secondary cache buffer that holds address information as a request of the cache for reference to data stored in the main storage; a primary cache buffer that holds address information as a request of the primary cache for reference to data of the secondary cache; and a plurality of central processors that control the cache in referring to data stored in the main storage, comprising:
obtaining device identification information of the central processors;
detecting number of cache buffers in the primary cache buffer that hold the reference requests for each central processor based on the device identification information; and
controlling to hold the reference requests in the primary cache buffer such that the number of cache buffers detected for each central processor does not exceed a predetermined number and an exclusive use of the primary cache buffer by a particular thread is prohibited, wherein
the memory control device further includes a reference request transfer port as a buffer that transfers the reference requests from the primary cache to the secondary cache, wherein
when there is no room in the primary cache buffer for a reference request other than reference requests that are controlled to be held in the cache buffer, the controlling includes controlling to hold in the primary cache buffer the reference request that is controlled to be held in the cache buffer, transferring the reference requests other than reference requests that are controlled to be held in the cache buffer from the primary cache to the secondary cache using the reference request transfer port, and making the reference request transfer port start to store data stored in the main storage in the secondary cache as well as deterring the primary cache from storing data from the secondary cache, and
when there is room in the primary cache buffer after the reference request transfer port starts to store the data in the secondary cache, the controlling includes requesting to store the data stored in the secondary cache in the primary cache via the primary cache buffer.

* * * * *

UNITED STATES PATENT AND TRADEMARK OFFICE
CERTIFICATE OF CORRECTION

PATENT NO. : 7,487,295 B2  Page 1 of 1
APPLICATION NO. : 10/991871
DATED : February 3, 2009
INVENTOR(S) : Iwao Yamazaki It is certified that error appears in the above-identified patent and that said Letters Patent is hereby corrected as shown below:

Column 11, Line 33, change "1. 1." to --1.--.

Column 12, Line 57, change "buffer." to --buffer,--.

Column 13, Line 48, change "pork" to --port,--.

Signed and Sealed this

Fourteenth Day of April, 2009

JOHN DOLL
*Acting Director of the United States Patent and Trademark Office*